United States Patent
Tanaka

(10) Patent No.: US 11,525,682 B2
(45) Date of Patent: Dec. 13, 2022

(54) HOST VEHICLE POSITION ESTIMATION DEVICE

(71) Applicant: Toyota Jidosha Kabushiki Kaisha, Toyota (JP)

(72) Inventor: Kazushi Tanaka, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 16/552,252

(22) Filed: Aug. 27, 2019

(65) Prior Publication Data
US 2020/0072617 A1    Mar. 5, 2020

(30) Foreign Application Priority Data
Aug. 30, 2018    (JP) .............................. JP2018-161848

(51) Int. Cl.
| | |
|---|---|
| *G01C 21/16* | (2006.01) |
| *G01C 21/28* | (2006.01) |
| *G01S 19/47* | (2010.01) |
| *G01S 19/39* | (2010.01) |
| *G06V 20/56* | (2022.01) |
| *G01S 5/02* | (2010.01) |

(52) U.S. Cl.
CPC ..... *G01C 21/1656* (2020.08); *G01C 21/1652* (2020.08); *G01C 21/28* (2013.01); *G01S 19/393* (2019.08); *G01S 19/47* (2013.01); *G06V 20/588* (2022.01); *G01S 5/0294* (2013.01)

(58) Field of Classification Search
CPC ....... G01C 21/28; G01C 21/165; G01S 19/47; G01S 19/48; G01S 19/393; G01S 5/0294; G06K 9/00798
See application file for complete search history.

(56) References Cited

U.S. PATENT DOCUMENTS

| | | | |
|---|---|---|---|
| 10,048,699 B2 | 8/2018 | Inoue et al. | |
| 10,310,508 B2 | 6/2019 | Kunisa et al. | |
| 10,493,987 B2 | 12/2019 | Ohsugi | |
| 10,845,814 B2 | 11/2020 | Funayama et al. | |
| 10,890,453 B2 | 1/2021 | Tateishi | |
| 10,953,886 B2 | 3/2021 | Suwabe et al. | |

(Continued)

FOREIGN PATENT DOCUMENTS

JP            4165407 B2    10/2008

*Primary Examiner* — Christian Chace
*Assistant Examiner* — Jordan S Fei
(74) *Attorney, Agent, or Firm* — Dinsmore & Shohl LLP

(57) ABSTRACT

A host vehicle position estimation device includes an observation position estimation unit configured to estimate an observation position of the vehicle based on a result of recognition of the target object performed, a prediction position calculation unit configured to calculate a prediction position of the vehicle from a result of estimation of the host vehicle position in the past based on a result of measurement performed by an internal sensor, a host vehicle position estimation unit configured to estimate the host vehicle position based on the observation position and the prediction position. The host vehicle position estimation unit is configured to give more weighting to the prediction position in the estimation of the host vehicle position such that the host vehicle position is estimated to be close to the prediction position if it is determined that a result of estimation of the host vehicle position is unsteady.

6 Claims, 7 Drawing Sheets

(56) References Cited

U.S. PATENT DOCUMENTS

| | | |
|---|---|---|
| 11,092,442 B2 | 8/2021 | Mori et al. |
| 11,156,466 B2 | 10/2021 | Morimoto |
| 11,300,415 B2 | 4/2022 | Ishida |
| 2018/0165831 A1* | 6/2018 | Kwant ................. G05D 1/0251 |
| 2018/0365500 A1* | 12/2018 | Nelapati ................ G01C 21/30 |
| 2019/0265041 A1* | 8/2019 | Merfels .................. G01S 17/86 |
| 2019/0385459 A1* | 12/2019 | Mizoguchi ...... B60W 30/18109 |
| 2020/0041285 A1* | 2/2020 | Kato .................... G09B 29/003 |
| 2020/0114923 A1* | 4/2020 | Kato ................. G01C 21/1652 |
| 2020/0300636 A1* | 9/2020 | Stahlin ................ G01C 21/165 |

* cited by examiner

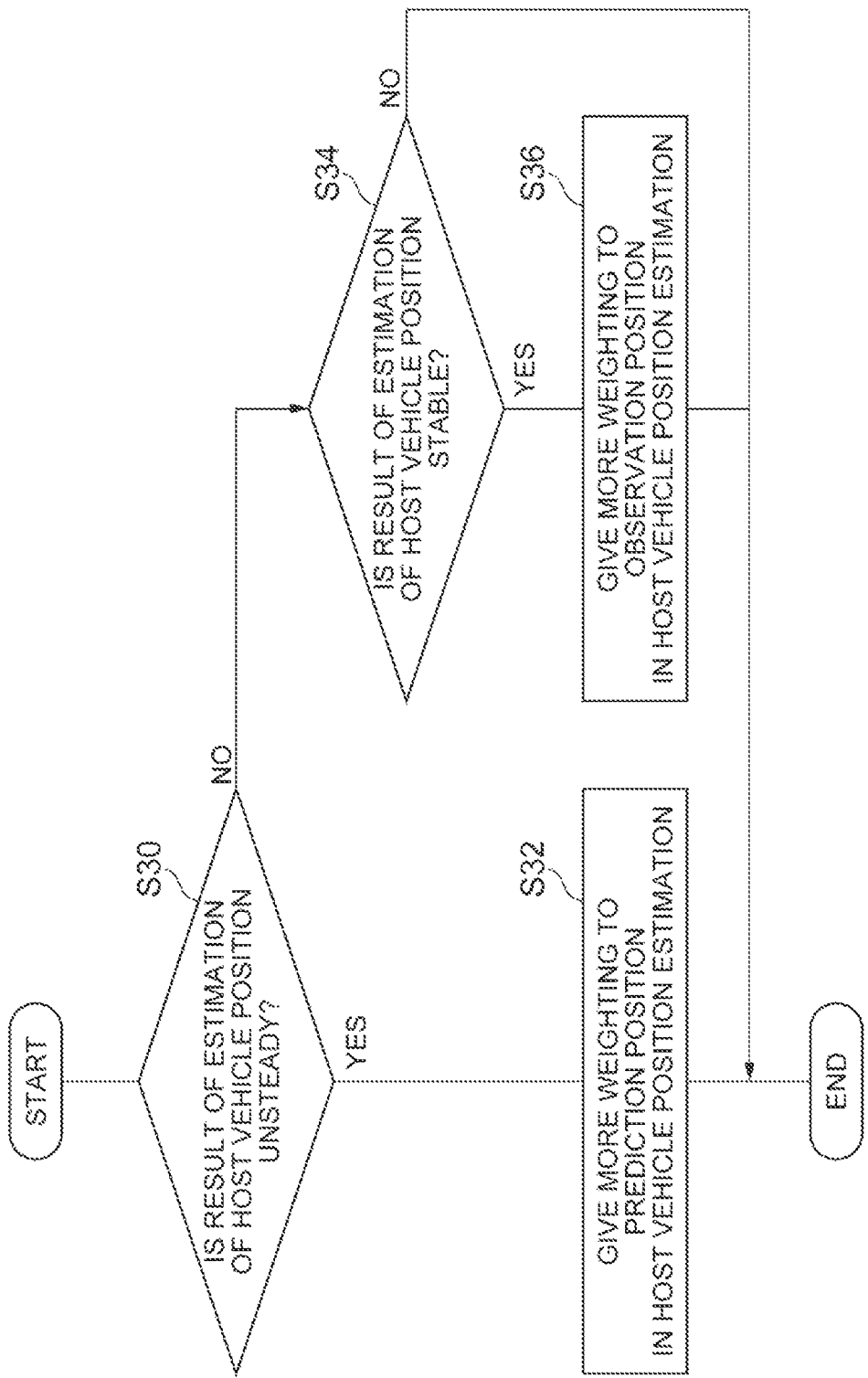

HOST VEHICLE POSITION ESTIMATION DEVICE

TECHNICAL FIELD

The present disclosure relates to a host vehicle position estimation device.

CROSS-REFERENCE TO RELATED APPLICATION

This application claims the benefit of priority from Japanese Patent Application No. 2018-161848, filed Aug. 30, 2018, the entire contents of which are incorporated herein by reference.

BACKGROUND

In the related art, Japanese Patent No. 4165407 is known as a technical literature relating to a host vehicle position estimation device. This publication discloses a position estimation device that estimates a position of a mobile object. The device acquires estimation position information obtained from a GPS estimated position referring to speed information and prediction position information predicted from a change in the GPS estimated position in the past GPS, performs weighting of the estimation position information and the prediction position information according to a moving speed of the moving object or the like, and selects and display any one of the weighted estimation position information or the weighted prediction position information.

SUMMARY

Incidentally, in an estimation of a host vehicle position which is a position of a vehicle on a map, a method is known, in which a target object such as marking lines on a road is used. The host vehicle position estimation using the target object is performed using a result of recognition of the target object by an external sensor of the vehicle and the position information on the target object on the map stored in advance. However, in the host vehicle position estimation using only the target object, there is a room for more study in that an unsteadiness of the host vehicle position may occur due to a state of the target object such as scrapes of the marking lines or an erroneous detection.

Therefore, in the present technical field, it is desired to provide a host vehicle position estimation device that can suppress the unsteadiness in the result of estimation of the host vehicle position from continuing.

According to an aspect of the present disclosure, there is provided a host vehicle position estimation device that is configured to estimate a host vehicle position that is a position of a vehicle on a map. The device is configured to include a target object recognition unit configured to recognize a target object around the vehicle based on a result of detection performed by an external sensor of the vehicle, a target object database configured to store target object information including position information on the target object on the map, an observation position estimation unit configured to estimate an observation position of the vehicle on the map based on a result of recognition of the target object performed by the target object recognition unit and the target object information, a prediction position calculation unit configured to calculate a prediction position of the vehicle on the map from a result of estimation of the host vehicle position in the past based on a result of measurement performed by an internal sensor of the vehicle, a host vehicle position estimation unit configured to estimate the host vehicle position based on the observation position and the prediction position, and an unsteadiness determination unit configured to determine whether or not the result of estimation of the host vehicle position is unsteady based on a variation of the host vehicle position. The host vehicle position estimation unit is configured to give more weighting to the prediction position in the estimation of the host vehicle position such that the host vehicle position is estimated to be close to the prediction position if it is determined by the unsteadiness determination unit that the result of estimation of the host vehicle position is unsteady.

According to the host vehicle position estimation device in the aspect of the present disclosure, when the result of estimation of the host vehicle position is unsteady caused by the influence of a shift of the observation position due to the state of the target object such as the scrapes of the marking lines or the erroneous detection and the like, since more weighting is given to the prediction position such that the host vehicle position is estimated to be close to the prediction position calculated from the result of measurement such as the vehicle speed, the acceleration, or the yaw rate performed by the internal sensor, it is possible to suppress the unsteadiness in the result of estimation of the host vehicle position from continuing compared to a case of using the prediction position and the observation position in a fixed ratio for the host vehicle position estimation.

In the host vehicle position estimation device according to the aspect of the present disclosure, the host vehicle position estimation unit may be configured to estimate the host vehicle position from the observation position and the prediction position using a position Kalman filter, and to change the weighting of the prediction position by changing a gain of the position Kalman filter.

According to another aspect of the present disclosure, there is provided a host vehicle position estimation device that is configured to estimate a host vehicle position that is a position of a vehicle on a map and an azimuth angle of the host vehicle position. The device is configured to include a target object recognition unit configured to recognize a target object around the vehicle based on a result of detection performed by an external sensor of the vehicle, a target object database configured to store target object information including position information on the target object on the map, an observation position estimation unit configured to estimate an observation position of the vehicle on the map and an observation azimuth angle of the vehicle on the map based on a result of recognition of the target object performed by the target object recognition unit and the target object information, a prediction position calculation unit configured to calculate a prediction position of the vehicle on the map and a prediction azimuth angle of the vehicle on the map from a result of estimation of the host vehicle position in the past and the result of estimation of the azimuth angle of the host vehicle position in the past based on a result of measurement performed by an internal sensor of the vehicle, a host vehicle position estimation unit configured to estimate the host vehicle position and the azimuth angle of the host vehicle position based on the observation position and the observation azimuth angle and the prediction position and the prediction azimuth angle, and an unsteadiness determination unit configured to determine whether or not the result of estimation of the host vehicle position is unsteady based on a variation of the host vehicle position or a variation of the azimuth angle of the host vehicle position. The host vehicle position estimation unit is configured to give more weighting to the prediction position in the estimation of the host vehicle position such that the host vehicle position is estimated to be close to the prediction position and to give more weighting to the prediction azimuth angle such that the azimuth angle of the host vehicle position is estimated to be close to the prediction azimuth angle if it is determined by the unsteadiness determination unit that the result of estimation of the host vehicle position is unsteady.

According to the other host vehicle position estimation device in the aspect of the present disclosure, when the result of estimation of the host vehicle position is unsteady caused by the influence of a shift of the observation position and/or the observation azimuth angle due to the state of the target object such as the scrapes of the marking lines or the erroneous detection and the like, since more weighting is given to the prediction position such that the host vehicle position is estimated to be close to the prediction position calculated from the result of measurement such as the vehicle speed, the acceleration, or the yaw rate performed by the internal sensor, it is possible to suppress the unsteadiness in the result of estimation of the host vehicle position from continuing compared to a case of using only the observation position for the host vehicle position estimation and using the prediction position and the observation position in a fixed ratio for the host vehicle position estimation. In addition, according to host vehicle position estimation device, when the result of estimation of the host vehicle position is unsteady, since the more weighting is given to the prediction azimuth angle such that the azimuth angle is estimated to be close to the prediction azimuth angle, it is possible to suppress the unsteadiness of the azimuth angle of the host vehicle position from continuing, compared to a case of using the azimuth angle of the host vehicle position for the estimation with the fixed ratio of the observation azimuth angle to the prediction azimuth angle.

In the host vehicle position estimation device according to the aspect of the present disclosure, the host vehicle position estimation unit may be configured to estimate the host vehicle position from the observation position and the prediction position using a position Kalman filter, and to change the weighting of the prediction position by changing a gain of the position Kalman filter.

In the host vehicle position estimation device according to the aspect of the present disclosure, the host vehicle position estimation unit may be configured to estimate the azimuth angle of the host vehicle position from the observation azimuth angle and the prediction azimuth angle using an azimuth angle Kalman filter, and to change the weighting of the prediction azimuth angle by changing an azimuth angle gain of the azimuth angle Kalman filter.

As described above, according to the host vehicle position estimation device in an aspect or another aspect of the present disclosure, it is possible to suppress the unsteadiness in the result of estimation of the host vehicle position from continuing.

BRIEF DESCRIPTION OF THE DRAWINGS

FIG. 4 is a flowchart illustrating an example of weighting change processing.

DETAILED DESCRIPTION

Hereinafter, embodiments of the present disclosure will be described with reference to the drawings.

First Embodiment

Figure 1:
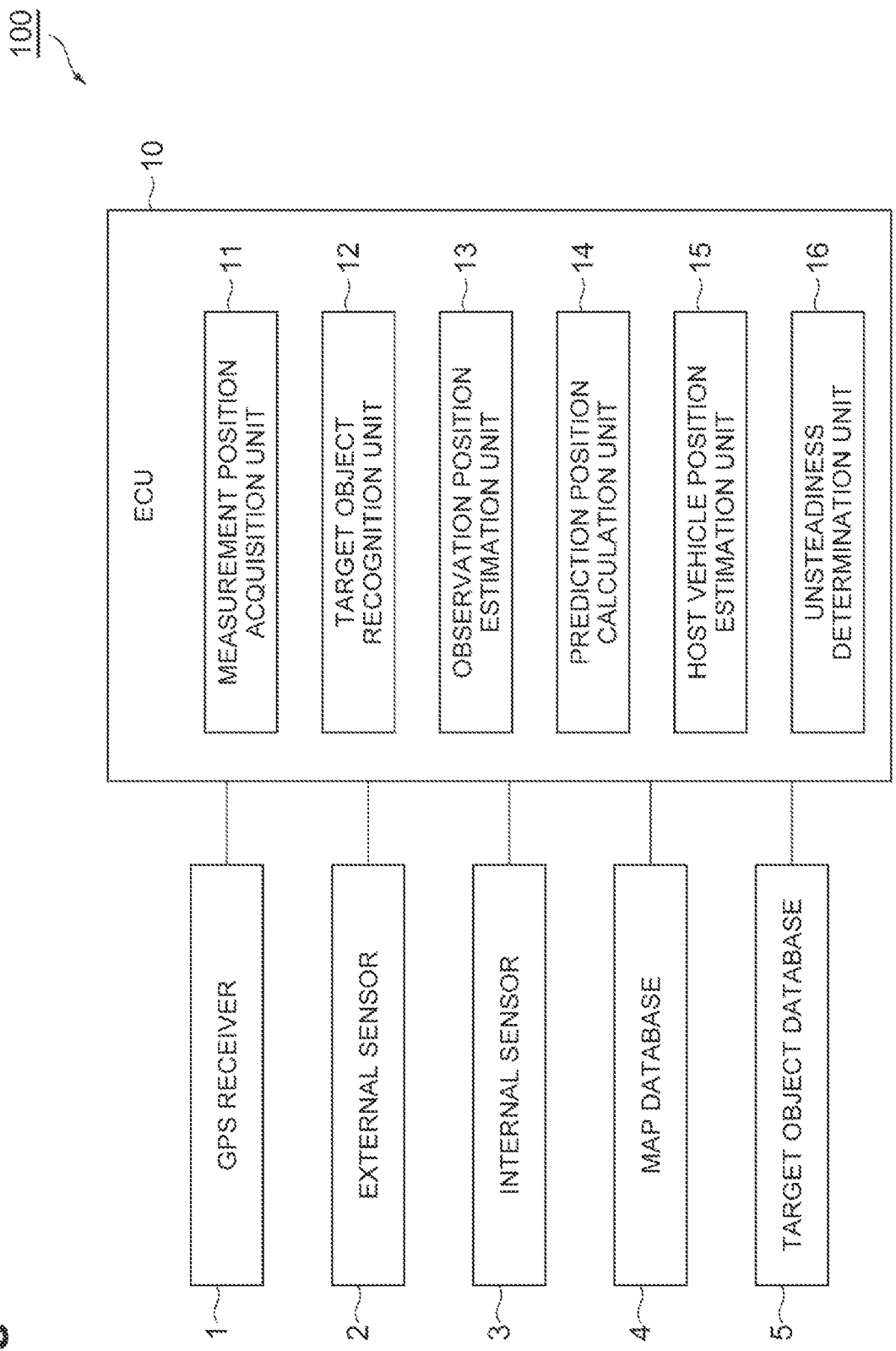
FIG. 1 is a block diagram illustrating a host vehicle position estimation device according to a first embodiment.

A host vehicle position estimation device 100 according to the first embodiment illustrated in FIG. 1 is a device mounted on a vehicle such as a passenger car, and is a device for performing an estimation of a host vehicle position which is a position of the vehicle (host vehicle) on a map. The criteria for the position of the vehicle on the map are not particularly limited, a predetermined center position of the vehicle or a center of gravity position of the vehicle may be used as the criteria.

Configuration of Host Vehicle Position Estimation Device in First Embodiment

As illustrated in FIG. 1, a host vehicle position estimation device 100 includes an electronic control unit (ECU) 10 that performs overall management of the system.

The ECU 10 is an electronic control unit including a central processing unit (CPU), read only memory (ROM), random access memory (RAM), and the like. In the ECU 10, for example, various functions are realized by loading a program stored in the ROM into the RAM and executing the program loaded in the RAM by the CPU. The ECU 10 may be configured with a plurality of electronic units.

The ECU 10 is connected to a global position system (GPS) receiver 1, an external sensor 2, an internal sensor 3, a map database 4, and a target object database 5.

The GPS receiver 1 is a measurement unit that measures the position of the vehicle on the map (for example, the latitude and longitude of the vehicle) by receiving signals from three or more GPS satellites. The GPS receiver 1 transmits the measured position information (a result of measurement) on the vehicle to the ECU 10. Instead of the GPS receiver 1, the Global Navigation Satellite System (GNSS) receiver may be used.

The external sensor 2 is a detection device that detects a surrounding situation of the vehicle. The external sensor 2 also functions as a sensor that detects a target object stored in the target object database 5 described below. The external sensor 2 includes at least one of a camera and a radar sensor.

The camera is an imaging device that images an external situation of the vehicle. The camera is provided on the inside of a windshield of the vehicle, and images the front of the vehicle. The camera transmits the imaging information relating to the external situation of the vehicle to the ECU

10. The camera may be a monocular camera or may be a stereo camera. A plurality of cameras may be provided, and images may be captured in directions other than the front of the vehicle.

The radar sensor is a detection device that detects objects around the vehicle using radio waves (for example, millimeter waves) or light. The radar sensor includes, for example, at least one of the millimeter wave radar and a light detection and ranging (LIDAR). The radar sensor transmits the radio wave or light to the surroundings of the vehicle, and detects the objects by receiving radio waves or light reflected from the objects. The radar sensor transmits the detected object information to the ECU 10. The objects include fixed objects such as guard rails and buildings, as well as moving objects such as pedestrians, bicycles, and other vehicles.

The internal sensor 3 is a detection device that detects a traveling state of the vehicle. The internal sensor 3 includes a vehicle speed sensor, an accelerator sensor, and a yaw rate sensor. The vehicle speed sensor is a measuring device that measures a speed of the vehicle. As the vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information (vehicle wheel speed information) to the ECU 10.

The accelerator sensor is a measuring device that measures an acceleration of the vehicle. The accelerator sensor includes, for example, a longitudinal accelerator sensor that measures acceleration in the longitudinal direction of the vehicle and a lateral accelerator sensor that measures a lateral acceleration of the vehicle. The accelerator sensor, for example, transmits the acceleration information of the vehicle to the ECU 10. The yaw rate sensor is a measuring device that measures a yaw rate (rotation angular velocity) around the vertical axis at the center of gravity of the vehicle. As the yaw rate sensor, for example, a Gyro sensor can be used. The yaw rate sensor transmits the measured yaw rate information of the vehicle to the ECU 10. When used for measurement of the position of the vehicle on the map by odometry or the like, the internal sensor 3 corresponds to a position measurement unit mounted on the vehicle.

The map database 4 is a database that stores map information. The map database 4 is formed, for example, in a storage device such as a hard disk drive (HDD) mounted on the vehicle. The map information includes position information (including position information on a lane), information on a shape of the road (for example, a curve, or the like), information on positions of a merge point and a branch. The map database 4 may be stored in a server such as a management center that can communicate with the vehicle.

The target object database 5 is a database for storing target object information relating to the target object. The target object is an object whose position information on the map is known, and is used as a reference for the host vehicle position estimation. The target object includes marking lines on the road. The target object may include a road marking such as a stop line, a road sign, a guardrail, a traffic signal, and the like.

The target object information includes position information on the target object on the map and appearance information on the target object. The position information on the target object on the map includes information on the coordinate position of the target object on the map in a plan view, and information on a height of the target object. The appearance information on the target object is information relating to the appearance of the target object used for recognizing (specifying) the target object from the captured image by the camera or the detection information by the radar sensor. The appearance information on the target object may include the size of the target object.

The target object database 5 may be a database integrated with the map database 4. The target object database 5 may be stored in a server such as a management center that can communicate with the vehicle.

Next, a functional configuration of the ECU 10 will be described. The ECU 10 includes a measurement position acquisition unit 11, a target object recognition unit 12, an observation position estimation unit 13, a prediction position calculation unit 14, a host vehicle position estimation unit 15, and an unsteadiness determination unit 16. A part of the functions of the ECU 10 described above may be performed by a server capable of communicating with the vehicle.

The measurement position acquisition unit 11 acquires a measurement position that is the position of the vehicle on the map, based on the position information (a result of measurement) of the vehicle measured by the GPS receiver 1. The measurement position acquisition unit 11 acquires the measurement position, for example, as information on the latitude and longitude.

The target object recognition unit 12 recognizes the target objects around the vehicle based on a result of measurement by the external sensor 2. The target object recognition unit 12 narrows down the target object candidates detected by the external sensor 2 of the vehicle among the target object information in the target object database 5 using, for example, the measurement position of the vehicle measured by the measurement position acquisition unit 11, and recognizes the target object around the vehicle from the result of measurement by the external sensor 2 and the appearance information on target object candidates. The target object recognition unit 12 can recognize the target object such as marking lines by performing image processing such as an edge extraction, the Hough transform, and pattern matching on the image captured by the camera, for example. The target object may be recognized from the image captured by the camera, may be recognized from the object information by the radar sensor, and may be recognized from both the captured image and the object information. The target object recognition unit 12 also recognizes a relative position of the recognized target object to the vehicle.

The target object recognition unit 12 does not always need to use the measurement position of the vehicle, and may use the host vehicle position estimated in the past (for example, in the previous time) instead, if the host vehicle position estimation has already been performed. Furthermore, the target object recognition unit 12 does not necessarily use the measurement position or the host vehicle position in the past. The target object recognition unit 12 may narrow down target object candidates from an arrangement pattern of the target objects existing around the vehicle or may specify a road guide sign from the target object information by recognizing the image of the display content of the road guide sign. The method of recognizing the target object is not limited, and various methods can be adopted.

The observation position estimation unit 13 estimates an observation position of the vehicle on the map based on the result of recognition of the target object performed by the target object recognition unit 12 and the target object information in the target object database 5. The observation position is a position of the vehicle on the map obtained from the result of recognition of the target object. The observation position is estimated based on a relative position between the vehicle and target object obtained from the result of recognition of the target object performed by the target object recognition unit 12 and the position of the target object on the map included in the target object information.

As an example, the observation position estimation unit 13 estimates the observation position in the lateral direction (the width direction of the lane) from a relative position between marking lines at the right and left side of the vehicle's traveling lane and the vehicle. The observation position estimation unit 13 estimates the observation position in the longitudinal direction from end portions of each line segments configuring dashed marking lines in the longitudinal direction (the end portions in the extending direction of the lane). The observation position estimation unit 13 may estimate the observation position in the longitudinal direction from a road marking such as a stop line or a road sign. The observation position estimation unit 13 estimates the observation position of the vehicle from the observation position in the lateral direction and the observation position in the longitudinal direction.

The prediction position calculation unit 14 calculates a prediction position of the vehicle on the map from a past result of estimation of the host vehicle position based on the result of measurement performed by the internal sensor 3. The prediction position is a position of the vehicle on the map predicted by a so-called odometry. The prediction position calculation unit 14 calculates the prediction position as a current position of the vehicle on the map from the past host vehicle position. The prediction position calculation unit 14 can calculate the prediction position using a history of the vehicle speed and the yaw rate of the vehicle from the past host vehicle position based on, for example, the vehicle speed measured by the vehicle speed sensor and the yaw rate measured by the yaw rate sensor. The prediction position calculation unit 14 may use a history of acceleration measured by the accelerator sensor instead of the history of vehicle speed measured by the vehicle speed sensor.

The past host vehicle position may be the host vehicle position one time previously (for example, previous one frame) estimated by the host vehicle position estimation, or the host vehicle position several times previously estimated by the host vehicle position estimation. When performing the host vehicle position estimation for the first time, the measurement position may be used as the past host vehicle position.

Figure 2:
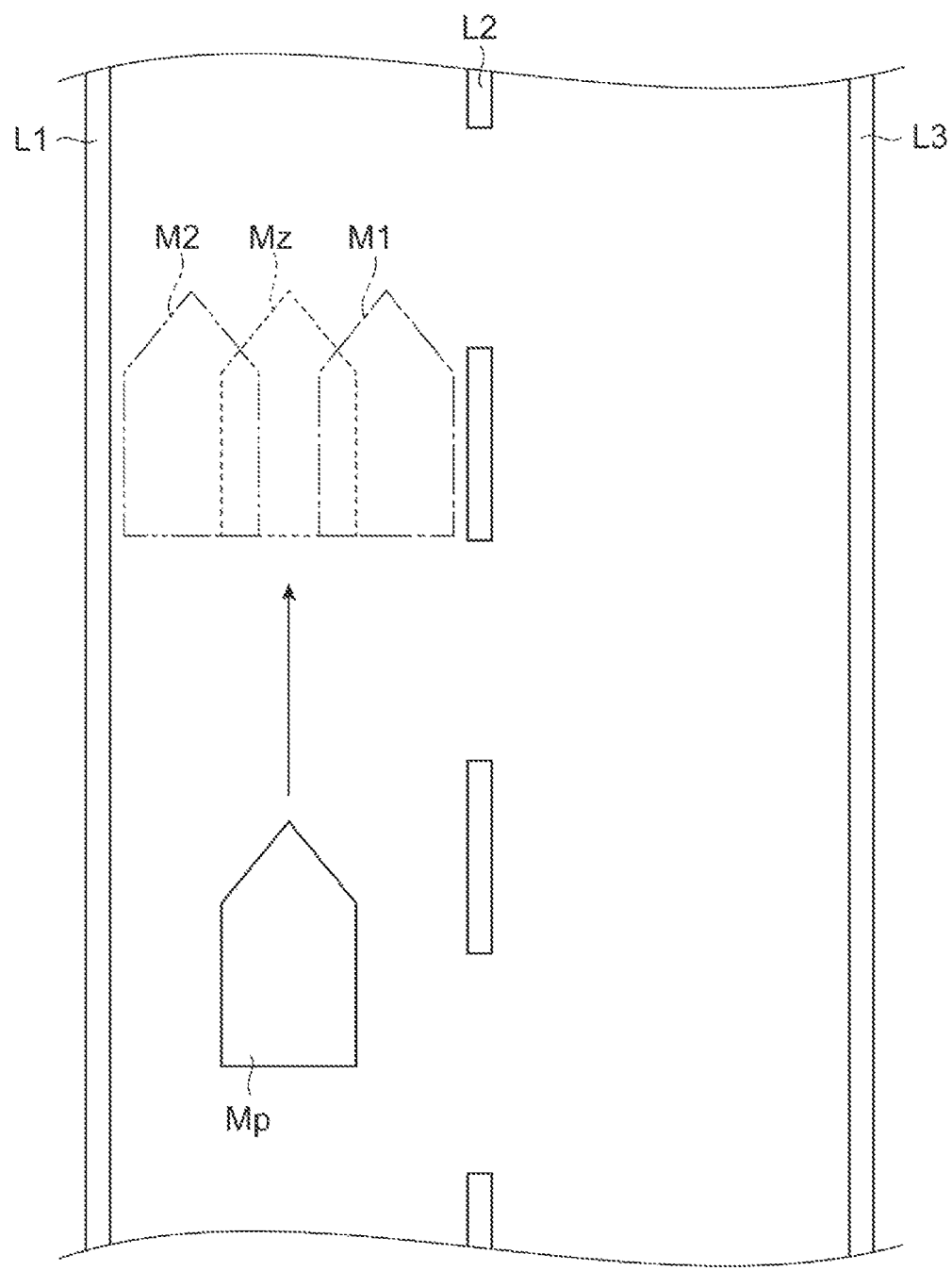
FIG. 2 is a plan view for describing an estimation of a host vehicle position based on a prediction position and an observation position.

The host vehicle position estimation unit 15 estimates the host vehicle position based on the observation position estimated by the observation position estimation unit 13 and the prediction position calculated by the prediction position calculation unit 14. Here, FIG. 2 is a plan view for describing the host vehicle position estimation based on the prediction position and the observation position. In FIG. 2, a marking line L1 on the left side of the vehicle, a marking line L2 (dashed marking line) on the right side of the vehicle, a marking line L3 of the adjacent lane of the vehicle, a past host vehicle position Mp which was one time previously estimated, a prediction position M1 of the vehicle, an observation position M2 of the vehicle, and the host vehicle position Mz of the vehicle are illustrated.

The prediction position M1 illustrated in FIG. 2 is the current prediction position of the vehicle calculated using the history of the vehicle speed and the yaw rate of the vehicle from the past host vehicle position Mp. The observation position M2 is the current observation position of the vehicle estimated by the observation position estimation unit 13 from the result of recognition of the left marking lines L1 and the right marking lines L2 recognized by the target object recognition unit 12. The host vehicle position Mz of the vehicle is the current position of the vehicle on the map (the result of estimation of the host vehicle position) estimated from the prediction position M1 and the observation position M2.

In the situation illustrated in FIG. 2, the host vehicle position estimation unit 15 estimates a host vehicle position Mz from the prediction position M1 and the observation position M2 using a position Kalman filter. In the position Kalman filter, the current host vehicle position Mz is estimated as a state estimation value using the prediction position M1 as a predicted estimation value in the Kalman filter and the observation position M2 as an observation value.

Here, an example of the extended Kalman filter will be described. The extended Kalman filter can be expressed, for example, by following Equation (1), where n is the number of states.

$$x_{up} = x_{pre} + K(z - H \cdot x_{pre}) \quad (1)$$

In Equation (1), $x_{up}$ is an updated state estimation value (n rows and 1 column), $x_{pre}$ is a predicted estimation value (n rows and 1 column), K is a Kalman gain matrix (n rows and n columns), z is an observation value (n rows and n columns, and H is an observation matrix (n rows and n columns). In the position Kalman filter, $x_{up}$ corresponds to the current host vehicle position $M_z$, $x_{pre}$, corresponds to the prediction position M1, and z corresponds to the observation position M2.

In the position Kalman filter, by changing the Kalman gain (hereinafter referred to as a gain), it is possible to change the weighting of the prediction position M1 in the host vehicle position estimation. For example, reducing the system noise in the Kalman gain will increase the weighting of the prediction position M1. In addition, reducing the observation noise in the Kalman gain will increase the weighting of the observation position M2.

Specifically, the gain can be expressed by following Equation (2).

$$K = P_{pre} \cdot H^t (H \cdot P_{pre} \cdot H^t + R)^{-1} \quad (2)$$

Here, $P_{pre}$ is a prediction covariance matrix (n rows and n columns), Ht is a transposition matrix of observation matrix (n rows and n columns), and R is an observation noise matrix. By reducing the value of the diagonal component of this observation noise matrix, it is possible to increase the weight of the observation value (the observation position M2) in the host vehicle position estimation. In addition, the prediction covariance matrix can be expressed by following Equation (3).

$$P_{pre} = \Phi \cdot P_{up} \cdot \Phi^t + Q \quad (3)$$

Here, $P_{pre}$ is the current prediction covariance matrix (n rows and n columns), $P_{up}$ is the covariance matrix (n rows and n columns) after the previous update, $\Phi$ is a state transition matrix (n rows and n columns), and $\Phi^t$ is a state transition matrix transposition matrix (n rows and n columns), Q is a system noise matrix (n rows and n columns). By reducing the value of the diagonal component of this system noise matrix, it is possible to increase the weight of the predicted estimation value (the prediction position M1) in the host vehicle position estimation.

The host vehicle position estimation unit 15 sets, for example, a gain such that a ratio of the prediction position M1 to the observation position M2 becomes 50:50 as an initial setting. In this case, as illustrated in FIG. 2, the host vehicle position Mz is estimated as a position (intermediate position) equidistant from the prediction position M1 and the observation position M2. Details of gain change will be described later.

The host vehicle position estimation unit 15 does not necessarily need to estimate the host vehicle position Mz using the position Kalman filter. The host vehicle position estimation unit 15 may use a particle filter instead of the Kalman filter. The host vehicle position estimation unit 15 may estimate the host vehicle position Mz in accordance with the weighting of each of the prediction position M1 and the observation position M2 set in advance from the positions between the prediction position M1 and the observation position M2. For example, if the weighting of prediction position M1 in the estimation of host vehicle position Mz is 40 and the weighting of observation position M2 is 60, the host vehicle position estimation unit 15 estimates a position at which the ratio of the distance to the observation position M2 to the distance to the prediction position M1 is 40:60 on a straight line connecting the prediction position M1 and the observation position M2, as the host vehicle position Mz.

The unsteadiness determination unit 16 determines whether or not the result of estimation of the host vehicle position Mz is unsteady based on variation of the host vehicle position Mz estimated by the host vehicle position estimation unit 15. The unsteadiness determination unit 16 determines, for example, the unsteadiness of the host vehicle position Mz in the lane width direction of the vehicle.

The unsteadiness determination unit 16 calculates a difference between a minimum value and a maximum value of the lateral position deviation from the lane center of the vehicle in the result of estimation of the host vehicle position based on the results of host vehicle position estimation for a predetermined number of times in the past. If the difference is equal to or greater than an unsteadiness determination threshold value, the unsteadiness determination unit 16 determines that the result of estimation of the host vehicle position is unsteady. The predetermined number of times is not particularly limited, and may be, for example, 10 times (10 frames). The unsteadiness determination threshold value is a threshold value set in advance. For example, the unsteadiness determination threshold value can be 10 cm. It is not necessary to use the lateral position deviation from the lane center but a maximum value of variation of the lateral position fluctuation in the host vehicle position Mz for a predetermined number of times in the past may be used.

If it is determined that the result of estimation of the host vehicle position is unsteady by the unsteadiness determination unit 16, the host vehicle position estimation unit 15 gives more weighting to the prediction position M1 in the host vehicle position estimation such that the host vehicle position Mz is estimated to be close to the prediction position M1. The host vehicle position estimation unit 15 gives more weighting to the prediction position M1 by, for example, changing the gain of the position Kalman filter. As an example, the host vehicle position estimation unit 15 changes the weighting ratio of the prediction position M1 to the observation position M2 that is 50:50 in the initial setting to such a ratio that the prediction position M1:observation position M2=60:40.

The host vehicle position estimation unit 15 may give more weighting to the prediction position M1 at every time it is determined that result of estimation of the host vehicle position Mz is unsteady. The host vehicle position estimation unit 15 gives more weighting to the prediction position M1 such that the prediction position M1 is +10 and the observation position M2 is −10 in the weighting ratio at every time it is determined that result of estimation of the host vehicle position is unsteady. An upper limit may be provided in the change of weighting. The upper limit can be set in advance. The host vehicle position estimation unit 15 may provide the upper limit as the prediction position M1:the observation position M2=100:0, and may provide the upper limit as the prediction position M1:the observation position M2=80:20.

In addition, the unsteadiness determination unit 16 determines whether or not the result of estimation of the host vehicle position is stable. If the difference between the minimum value and the maximum value of the lateral position deviation from the lane center of the vehicle is smaller than a stability threshold value, the unsteadiness determination unit 16 determines that the result of estimation of the host vehicle position is stable based on the results of the host vehicle position estimation for predetermined number of times in the past. The predetermined number of times may be the same as the number of times at the time of unsteadiness determination, or may be different. The stability threshold value is a threshold value having a value set in advance, and is a threshold value having a value smaller than the unsteadiness determination threshold value. The stability threshold value can be 5 cm, for example.

If it is determined that the result of estimation of the host vehicle position is stable by the unsteadiness determination unit 16, the host vehicle position estimation unit 15 gives more weighting to the observation position M2 in the host vehicle position estimation such that the host vehicle position Mz is estimated to be close to the observation position M2. The host vehicle position estimation unit 15 gives more weighting to the observation position M2 by, for example, changing the gain of the position Kalman filter. As an example, the host vehicle position estimation unit 15 changes the weighting ratio of the prediction position M1 to the observation position M2, which were 50:50 in the initial setting, to such a ratio as the prediction position M1:the observation position M2=40:60.

The host vehicle position estimation unit 15 may give more weighting to the observation position M2 at every time it is determined that the result of estimation of the host vehicle position is stable. The host vehicle position estimation unit 15 gives more weighting to the observation position M2 such that the observation position M2 is +10 and the prediction position M1 is −10 in the weighting ratio at every time it is determined that the result of estimation of the host vehicle position is stable. An upper limit of the weighting change may be provided. The upper limit can be set in advance. The host vehicle position estimation unit 15 may provide the upper limit as the prediction position M1:the observation position M2=100:0, and may provide the upper limit as the prediction position M1:the observation position M2=20:80. The host vehicle position estimation unit 15 estimates the host vehicle position Mz from the prediction position M1 and the observation position M2 according to the changed weighting.

Processing by Host Vehicle Position Estimation Device According to First Embodiment Subsequently, the processing by the host vehicle position estimation device 100 according to the first embodiment will be described with reference to the drawings.

Figure 3A:
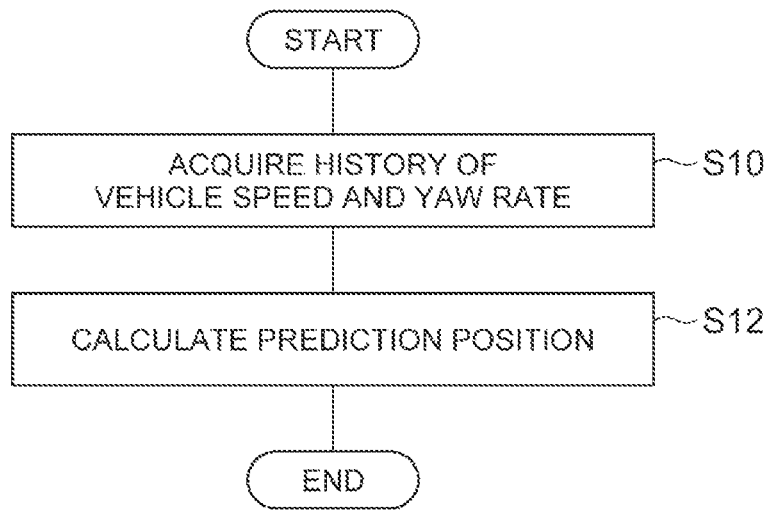
FIG. 3A is a flowchart illustrating an example of calculation processing for the prediction position.

FIG. 3A is a flowchart illustrating an example of the calculation processing for the prediction position. The calculation processing for the prediction position is performed while the vehicle is traveling. As illustrated in FIG. 3A, as S10, the ECU 10 of the host vehicle position estimation device 100 acquires the history of the vehicle speed and the yaw rate using the prediction position calculation unit 14. The prediction position calculation unit 14 acquires each history by measuring the vehicle speed of the vehicle from the vehicle speed sensor included in the internal sensor 3, and measuring the yaw rate of the vehicle from the yaw rate sensor included in the internal sensor 3. Thereafter, the ECU 10 makes the process proceed to S12.

In S12, the ECU 10 calculates the prediction position M1 using the prediction position calculation unit 14. The prediction position calculation unit 14 calculates the prediction position M1 of the vehicle on the map from the past result of estimation of the host vehicle position, based on the history of the vehicle speed and the yaw rate. Thereafter, the ECU 10 ends the current processing.

Figure 3B:
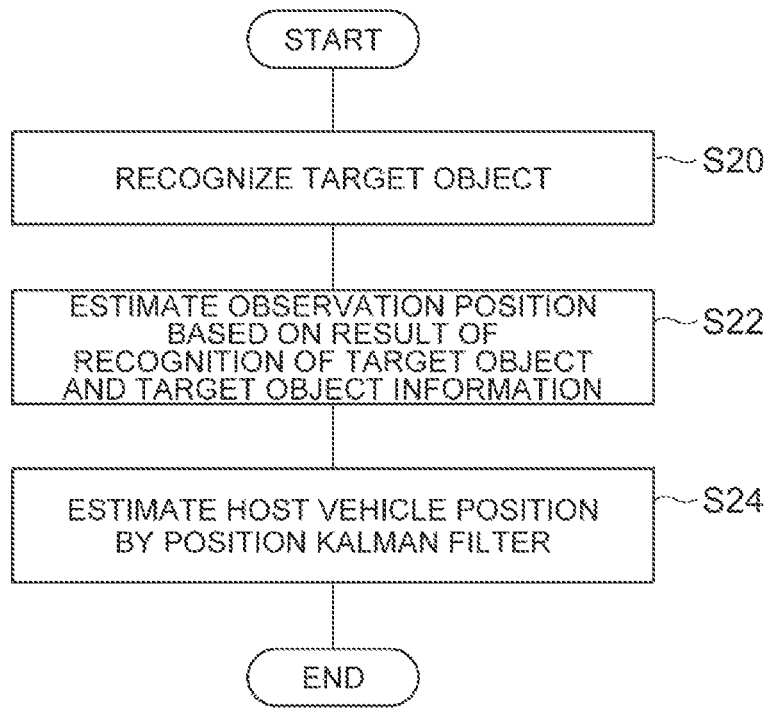
FIG. 3B is a flowchart illustrating an example of host vehicle position estimation processing using observation position.

FIG. 3B is a flowchart illustrating an example of host vehicle position estimation processing using the observation position. The host vehicle position estimation processing using the observation position is performed while the vehicle is traveling. As illustrated in FIG. 3B, as S20, the ECU 10 recognizes the target object around the vehicle using the target object recognition unit 12. The target object recognition unit 12 recognizes the target object around the vehicle based on the result of measurement performed by the external sensor 2. Thereafter, the ECU 10 makes the process proceed to S22.

In S22, the ECU 10 estimates the observation position M2 using the observation position estimation unit 13. The observation position estimation unit 13 estimates the observation position M2 of the vehicle on the map based on the result of recognition of the target object performed by the target object recognition unit 12 and the target object information in the target object database 5. Thereafter, the ECU 10 makes the process proceed to S24.

In S24, the ECU 10 estimates the host vehicle position Mz by the position Kalman filter using the host vehicle position estimation unit 15. The host vehicle position estimation unit 15 estimates the host vehicle position Mz based on the prediction position M1 calculated by the prediction position calculation unit 14 and the observation position M2 estimated by the observation position estimation unit 13. The host vehicle position estimation unit 15 estimates the host vehicle position Mz from the prediction position M1 and the observation position M2 in accordance with the weighting set in advance before the current processing.

When the ECU 10 cannot recognize the target object around the vehicle in S20, the ECU 10 ends the current processing. In this case, the ECU 10 may use the prediction position M1 as a temporary host vehicle position.

FIG. 4 is a flowchart illustrating an example of weighting change processing. The weighting change processing is performed, for example, when the host vehicle position estimation processing is performed a predetermined number of times. The weighting change processing may be performed according to the vehicle travel distance or may be performed periodically.

As illustrated in FIG. 4, as S30, the ECU 10 determines whether or not the result of estimation of the host vehicle position is unsteady using the unsteadiness determination unit 16. The unsteadiness determination unit 16 calculates the difference between the minimum value and the maximum value of the lateral position deviation from the lane center of the vehicle in the result of estimation of the host vehicle position based on the results of host vehicle position estimation for a predetermined number of times in the past, and if the difference is equal to or greater than the unsteadiness determination threshold value, determines that the result of estimation of the host vehicle position is unsteady. If it is determined that the result of estimation of the host vehicle position is unsteady (Yes in 30), the ECU 10 makes the process proceed to S32. If it is determined that the result of estimation of the host vehicle position is not unsteady (No in 30), the ECU 10 makes the process proceed to S34.

In S32, the ECU 10 gives more weighting to the prediction position M1 in the host vehicle position estimation using the host vehicle position estimation unit 15. The host vehicle position estimation unit 15 gives more weighting to the prediction position M1 in the host vehicle position estimation such that the host vehicle position Mz is estimated to be close to the prediction position M1. The host vehicle position estimation unit 15 gives more weighting to the prediction position M1 by, for example, changing the gain of the position Kalman filter. When the weighting of the prediction position M1 increases to reach the upper limit, the host vehicle position estimation unit 15 does not perform the weighting. Thereafter, the ECU 10 ends the current processing.

In S34, the ECU 10 determines whether or not the result of estimation of the host vehicle position is stable using the unsteadiness determination unit 16. The unsteadiness determination unit 16 calculates the difference between the minimum value and the maximum value of the lateral position deviation from the lane center of the vehicle in the result of estimation of the host vehicle position based on, for example, the results of host vehicle position estimation for a predetermined number of times in the past, and if the difference is smaller than the stability threshold value, determines that the result of estimation of the host vehicle position is stable. If it is determined that the result of estimation of the host vehicle position is stable (Yes in S34), the ECU 10 makes the process proceed to S36. If it is determined that the result of estimation of the host vehicle position is not stable (No in S34), the ECU 10 ends the current processing.

In S36, the ECU 10 gives more weighting to the observation position M2 in the host vehicle position estimation using the host vehicle position estimation unit 15. The host vehicle position estimation unit 15 gives more weighting to the observation position M2 in the host vehicle position estimation such that the host vehicle position Mz is estimated to be close to the observation position M2. The host vehicle position estimation unit 15 gives more weighting to the observation position M2 by, for example, changing the gain of the position Kalman filter. If the weighting of observation position M2 increases to reach the upper limit, the host vehicle position estimation unit 15 does not perform the increase of weighting. Thereafter, the ECU 10 ends the current processing.

According to the host vehicle position estimation device 100 according to the first embodiment described above, when the result of estimation of the host vehicle position is unsteady caused by the influence of a shift of the observation position M2 due to the state of the target object such as the scrapes of the marking lines or the erroneous detection and the like, since more weighting is given to the prediction position M1 such that the host vehicle position Mz is estimated to be close to the prediction position M1 calculated from the result of measurement performed by the internal sensor 3, it is possible to suppress the unsteadiness in the result of estimation of the host vehicle position from continuing compared to a case of using the prediction position M1 and the observation position M2 in a fixed ratio for the host vehicle position estimation.

In addition, according to the host vehicle position estimation device 100, it is possible to improve the accuracy of estimating the host vehicle position Mz by estimating the host vehicle position Mz using the position Kalman filter compared to a case of estimating the host vehicle position Mz with the fixed ratio of the prediction position M1 to the observation position M2 without using the position Kalman filter. In addition, in this case, it is possible to easily change the weighting for the prediction position M1 by changing the gain.

Second Embodiment

Figure 5:
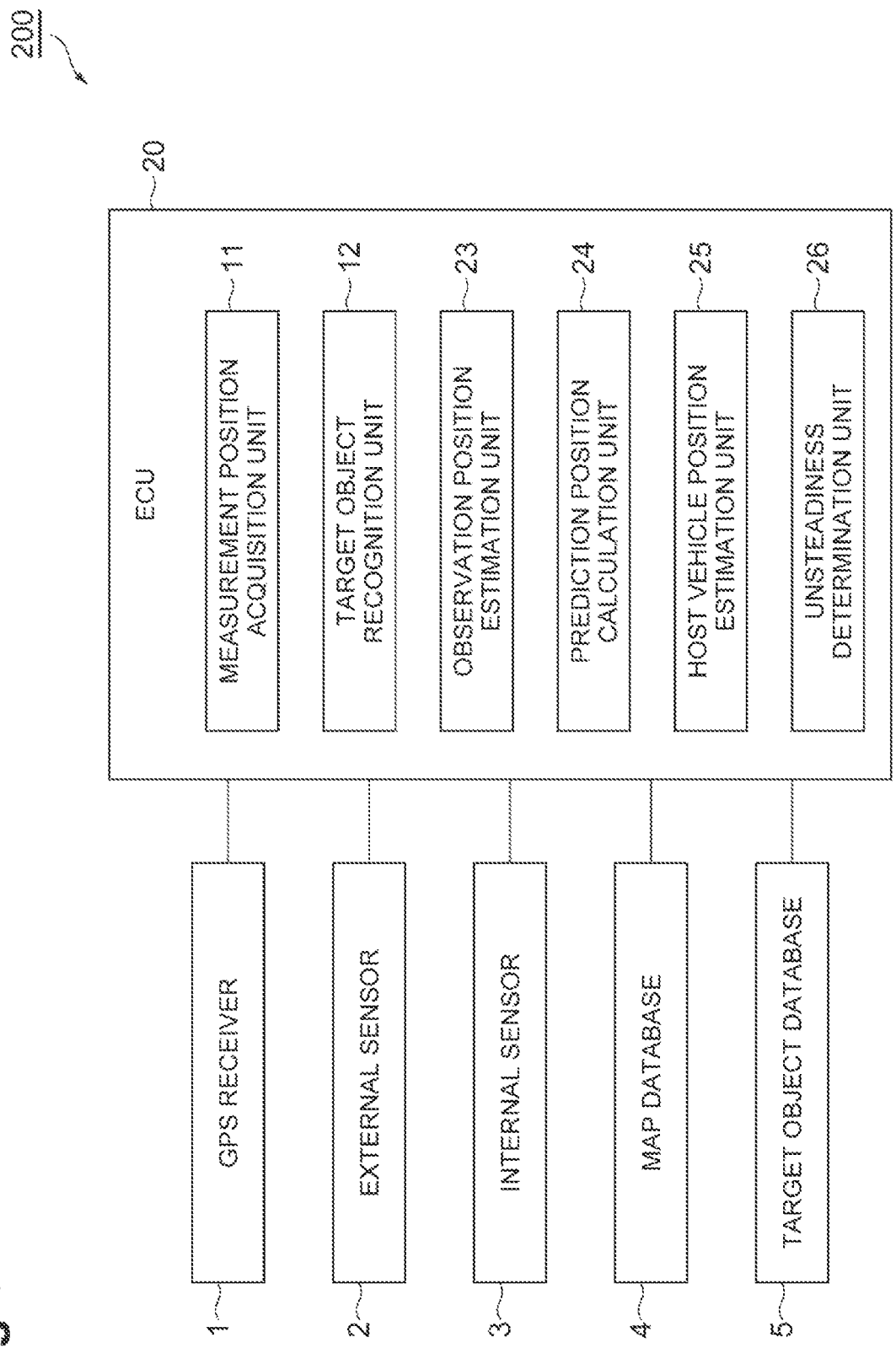
FIG. 5 is a block diagram illustrating a host vehicle position estimation device according to a second embodiment.

Subsequently, a host vehicle position estimation device according to a second embodiment will be described. FIG. 5 is a block diagram illustrating the host vehicle position estimation device according to the second embodiment. A host vehicle position estimation device 200 illustrated in FIG. 5 is mainly different from that in the first embodiment in a point that an azimuth angle of the host vehicle position Mz is estimated using an observation azimuth angle and a prediction azimuth angle. Details of the observation azimuth angle and the prediction azimuth angle will be described later. The azimuth angle is determined with respect to the map, and can be represented by, for example, as a positive angle in a clockwise direction from the north direction.

The azimuth angle may be determined with respect to the road on the map, on which the vehicle travels, and may be represented as a positive angle in a clockwise direction from the extending direction of the road.

Configuration of Host Vehicle Position Estimation Device in Second Embodiment

Hereinafter, a configuration of the host vehicle position estimation device 200 according to the second embodiment will be described. The same reference numerals will be given to the elements the same or corresponding to that in the first embodiment, and the detail descriptions thereof will not be repeated.

As illustrated in FIG. 5, in an ECU 20 of the host vehicle position estimation device 200, the functions of an observation position estimation unit 23, a prediction position calculation unit 24, a host vehicle position estimation unit 25, and an unsteadiness determination unit 26 are different from that in the ECU 10 in the first embodiment.

The observation position estimation unit 23 estimates the observation azimuth angle in addition to the estimation of the observation position M2 in the first embodiment. An observation azimuth angle is an azimuth angle of the vehicle on the map obtained from the result of recognition of the target object. The observation azimuth angle is estimated based on a relative position between the vehicle and target object obtained from the result of recognition of the target object performed by the target object recognition unit 12 and the position of the target object on the map included in the target object information. The observation azimuth angle may be estimated from an orientation of one target object (for example, whether the orientation is in front of or behind the road guide sign), or may be estimated by combining the relative positions of multiple target objects.

The prediction position calculation unit 24 calculates the prediction azimuth angle in addition to the calculation of the prediction position M1 in the first embodiment. The prediction azimuth angle is an azimuth angle of the vehicle on the map predicted by a so-called odometry. The prediction position calculation unit 24 calculates the prediction azimuth angle as a current azimuth angle of the vehicle on the map from the azimuth angle of the past host vehicle position. The prediction position calculation unit 24 can calculate the prediction azimuth angle using the history of the yaw rate of the vehicle with the azimuth angle of the past host vehicle position as a reference based on the yaw rate measured by the yaw rate sensor, for example.

The host vehicle position estimation unit 25 estimates the azimuth angle of the host vehicle position Mz in addition to the calculation of the host vehicle position Mz in the first embodiment. The host vehicle position estimation unit 25 estimates the azimuth angle of the host vehicle position Mz based on the prediction azimuth angle and the observation azimuth angle.

The host vehicle position estimation unit 25 estimates the azimuth angle of the host vehicle position Mz from the prediction position M1 and the observation position M2 using an azimuth angle Kalman filter. In the azimuth angle Kalman filter, the current azimuth angle of the host vehicle position Mz is estimated as a state estimation value using the prediction azimuth angle as a predicted estimation value in the Kalman filter and the observation azimuth angle as an observation value. As the azimuth angle Kalman filter, the extended Kalman filter described in the first embodiment can be applied.

In the azimuth angle Kalman filter, by changing the Kalman filter gain (hereinafter referred to as an azimuth angle gain), it is possible to change the weighting of the prediction azimuth angle in the host vehicle position estimation. The host vehicle position estimation unit 25 sets, for example, the azimuth angle gain such that a ratio of the prediction azimuth angle to the observation azimuth angle becomes 50:50 as an initial setting. In this case, the azimuth angle of the host vehicle position Mz is estimated as an azimuth angle of the same angle from the prediction azimuth angle and the observation azimuth angle. Details of azimuth angle gain change will be described later. The host vehicle position estimation unit 25 may further estimate the azimuth angle in consideration of the traveling direction of the lane.

The host vehicle position estimation unit 25 does not necessarily need to estimate the azimuth angle of the host vehicle position Mz using the azimuth angle Kalman filter. The host vehicle position estimation unit 25 may use a particle filter instead of the Kalman filter. The host vehicle position estimation unit 25 may estimate the azimuth angle of the host vehicle position Mz in accordance with the weighting of each of the prediction azimuth angle and the observation azimuth angle set in advance from the angle between the prediction azimuth angle and the observation azimuth angle. For example, if the weighting of the prediction azimuth angle in the estimation of host vehicle position is 40 and the weighting of the observation azimuth angle is 60, the host vehicle position estimation unit 25 estimates an azimuth angle that makes the ratio of the angle with the observation azimuth angle to the angle with the prediction azimuth angle becomes 40:60 as the azimuth angle of the host vehicle position Mz.

The unsteadiness determination unit 26 determines whether or not the result of estimation of the azimuth angle of the host vehicle position (including the result of estimation of the azimuth angle of the host vehicle position) is unsteady based on variation of the host vehicle position Mz estimated by the host vehicle position estimation unit 25.

The unsteadiness determination unit 26 calculates a variation of the yaw rate (a difference between a maximum value and a minimum value of the yaw rates) calculated from the azimuth angle of the host vehicle position Mz for a predetermined number of times in the past, based on the result of estimation of the azimuth angle of the host vehicle position Mz for a predetermined number of times in the past. If the variation of the yaw rate calculated from the azimuth angle of the host vehicle position Mz is equal to or greater than an unsteadiness azimuth angle threshold value, the unsteadiness determination unit 26 determines that the result of estimation of the host vehicle position is unsteady. The predetermined number of times is not particularly limited, and may be, for example, 10 times (10 frames). The unsteadiness azimuth angle threshold value is a threshold value set in advance. For example, the unsteadiness azimuth angle threshold value can be 0.1 deg/s.

If it is determined that the result of estimation of the host vehicle position is unsteady by the unsteadiness determination unit 26, the host vehicle position estimation unit 25 gives more weighting to the prediction azimuth angle in the host vehicle position estimation such that the azimuth angle of the host vehicle position Mz is estimated to be close to the prediction azimuth angle. The host vehicle position estimation unit 25 gives more weighting to the prediction azimuth angle by changing, for example, the azimuth angle gain of the azimuth angle Kalman filter. As an example, the host vehicle position estimation unit 25 changes the weighting ratio of the prediction azimuth angle to the observation azimuth angle, which was 50:50 in initial setting, to such a ratio that the prediction azimuth angle:observation azimuth angle=60:40.

The host vehicle position estimation unit 25 may give more weighting to the prediction azimuth angle at every time it is determined that the result of estimation of the host vehicle position is unsteady. The host vehicle position estimation unit 25 may give more weighting to the prediction azimuth angle such that the prediction azimuth angle is +10 and the observation azimuth angle is −10 in the weighting ratio at every time it is determined that result of estimation of the host vehicle position is unsteady. An upper limit may be provided in the change of weighting. The upper limit can be set in advance. The host vehicle position estimation unit 25 may provide the upper limit of prediction azimuth angle:observation azimuth angle=100:0, or may provide the upper limit of prediction azimuth angle:observation azimuth angle=80:20.

In addition, the unsteadiness determination unit 26 determines whether or not the result of estimation of the host vehicle position is stable. If the variation of the yaw rate calculated from the azimuth angle of the host vehicle position Mz for a predetermined number of times in the past is smaller than an azimuth angle stability threshold value, the unsteadiness determination unit 26 determines that the result of estimation of the host vehicle position is stable. The azimuth angle stability threshold value is a threshold value having a value set in advance, and is a threshold value having a value smaller than the unsteadiness azimuth angle threshold value.

The azimuth angle stability threshold value can be, for example, 0.05 deg/s.

If it is determined that the result of estimation of the host vehicle position is stable by the unsteadiness determination unit 26, the host vehicle position estimation unit 25 gives more weighting to the observation azimuth angle in the host vehicle position estimation such that the azimuth angle of the host vehicle position Mz is estimated to be close to the observation azimuth angle. The host vehicle position estimation unit 25 gives more weighting to the observation azimuth angle by, for example, changing the azimuth angle gain of the azimuth angle Kalman filter. As an example, host vehicle position estimation unit 25 changes the weighting ratio of the prediction azimuth angle to the observation azimuth angle, which were 50:50 in initial setting, to such a ratio as the prediction azimuth angle:observation azimuth angle=40:60.

The host vehicle position estimation unit 25 may give more weighting to the observation azimuth angle at every time it is determined that the result of the estimation of the host vehicle position is stable. The host vehicle position estimation unit 25 gives more weighting to the observation azimuth angle such that the observation azimuth angle is +10 and the prediction azimuth angle is −10 in the weighting ratio at every time it is determined that the result of estimation of the host vehicle position is stable. An upper limit of the weighting change may be provided. The upper limit can be set in advance. The host vehicle position estimation unit 25 may provide the upper limit as the prediction azimuth angle:observation azimuth angle=100:0, or may provide the upper limit as prediction azimuth angle:observation azimuth angle=20:80.

The host vehicle position estimation unit 25 estimates the azimuth angle of the host vehicle position Mz from the prediction azimuth angle and the observation azimuth angle according to the changed weighting. The host vehicle position estimation unit 25 may use the weighting of the prediction azimuth angle and the observation azimuth angle as the weighting of the prediction position M1 and the observation position M2 for estimating the host vehicle position Mz.

Processing by Host Vehicle Position Estimation Device According to Second Embodiment Subsequently, the processing by the host vehicle position estimation device 200 according to the second embodiment will be described with reference to the drawings.

Figure 6A:
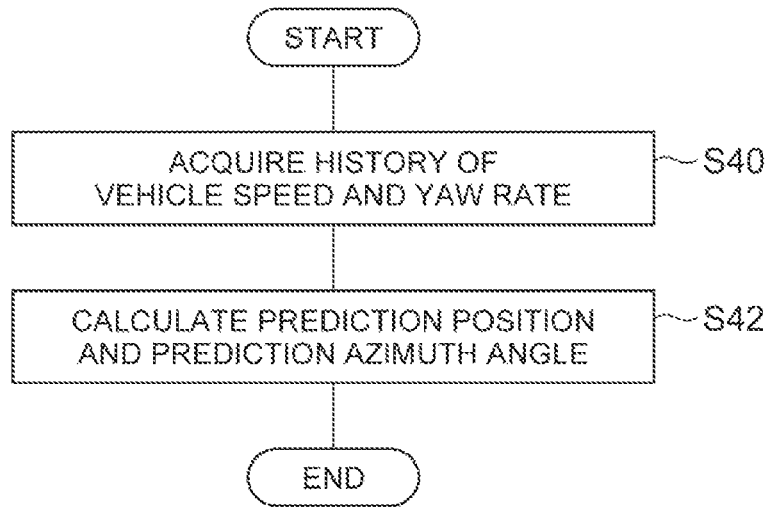
FIG. 6A is a flowchart illustrating an example of calculation processing for a prediction position and a prediction azimuth angle.

FIG. 6A is a flowchart illustrating an example of calculation processing for the prediction position and the prediction azimuth angle. The calculation processing for the prediction position and prediction azimuth angle is performed while the vehicle is traveling. As illustrated in FIG. 6A, as S40, the host vehicle position estimation device 200 acquires the history of the vehicle speed and the yaw rate using the prediction position calculation unit 24. The process in S40 corresponds to the processing in S10 in FIG. 3A. Thereafter, the ECU 20 makes the process proceed to S42.

In S42, the ECU 20 calculates the prediction position M1 and the prediction azimuth angle using the prediction position calculation unit 24. The prediction position calculation unit 24 calculates the prediction position M1 of the vehicle on the map from the past result of estimation of the host vehicle position based on the history of the vehicle speed and the yaw rate. In addition, the prediction position calculation unit 24 calculates the prediction azimuth angle of the vehicle on the map from the result of estimation of the azimuth angle of the past host vehicle position based on the history of the yaw rate. Thereafter, the ECU 20 ends the current processing.

Figure 6B:
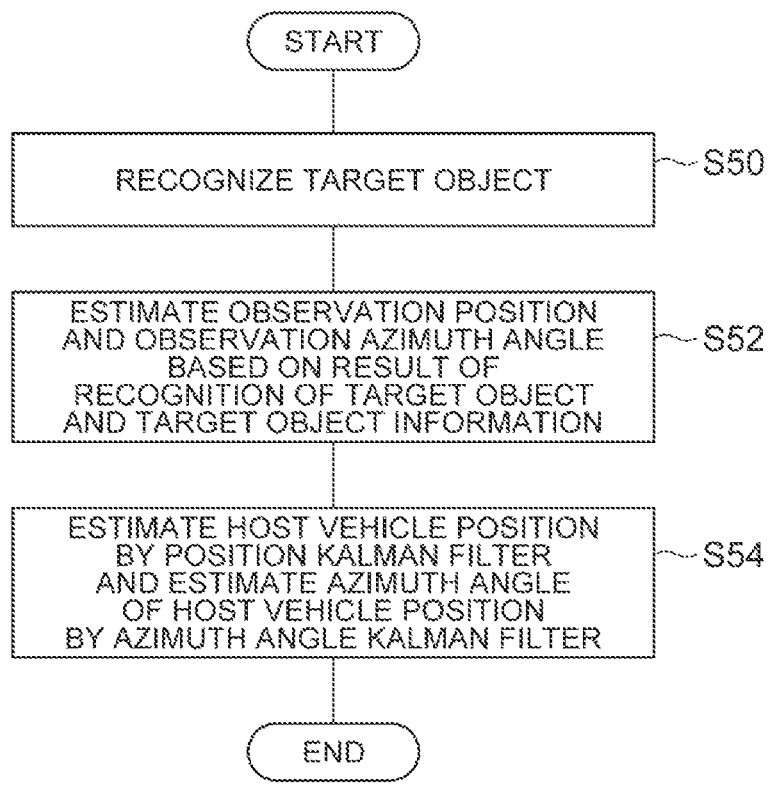
FIG. 6B is a flowchart illustrating an example of estimation processing for the host vehicle position and the azimuth angle of the host vehicle position using the observation position and the observation azimuth angle.

FIG. 6B is a flowchart illustrating an example of estimation processing for the host vehicle position and the azimuth angle of the host vehicle position using the observation position and the observation azimuth angle. The estimation processing is performed while the vehicle is traveling. As illustrated in FIG. 6B, as S50, the ECU 20 recognizes the target object around the vehicle using the target object recognition unit 12. The target object recognition unit 12 recognizes the target object around the vehicle based on the result of measurement performed by the external sensor 2. The processing in S50 corresponds to the processing in S20 in FIG. 3B. Thereafter, the ECU 20 makes the process proceed to S52.

In S52, the ECU 20 estimates the observation position M2 and the observation azimuth angle using the observation position estimation unit 23. The observation position estimation unit 23 estimates the observation position M2 of the vehicle on the map and the observation azimuth angle based on the result of recognition of the target object performed by the target object recognition unit 12 and the target object information in the target object database 5. Thereafter, the ECU 20 makes the process proceed to S54.

In S54, the ECU 20 estimates the host vehicle position Mz by the position Kalman filter and estimates the azimuth angle of the host vehicle position Mz by the azimuth angle Kalman filter using the host vehicle position estimation unit 25.

The host vehicle position estimation unit 25 estimates the host vehicle position Mz based on the prediction position M1 calculated by the prediction position calculation unit 24 and the observation position M2 estimated by the observation position estimation unit 23. The host vehicle position estimation unit 25 estimates the host vehicle position Mz from the prediction position M1 and the observation position M2 in accordance with the weighting set in advance before the current processing. Similarly, the host vehicle position estimation unit 25 estimates the azimuth angle of the host vehicle position Mz based on the prediction azimuth angle calculated by the prediction position calculation unit 24 and the observation azimuth angle estimated by the observation position estimation unit 23. The host vehicle position estimation unit 25 estimates the azimuth angle of the host vehicle position Mz from the prediction azimuth angle and the observation azimuth angle in accordance with the weighting set in advance before the current processing.

When the ECU 20 cannot recognize the target object around the vehicle in S50, the ECU 20 ends the current processing. In this case, the ECU 20 may use the prediction position M1 as a temporary host vehicle position Mz, and may use the prediction azimuth angle as a temporary azimuth angle of the host vehicle position Mz.

Figure 7:
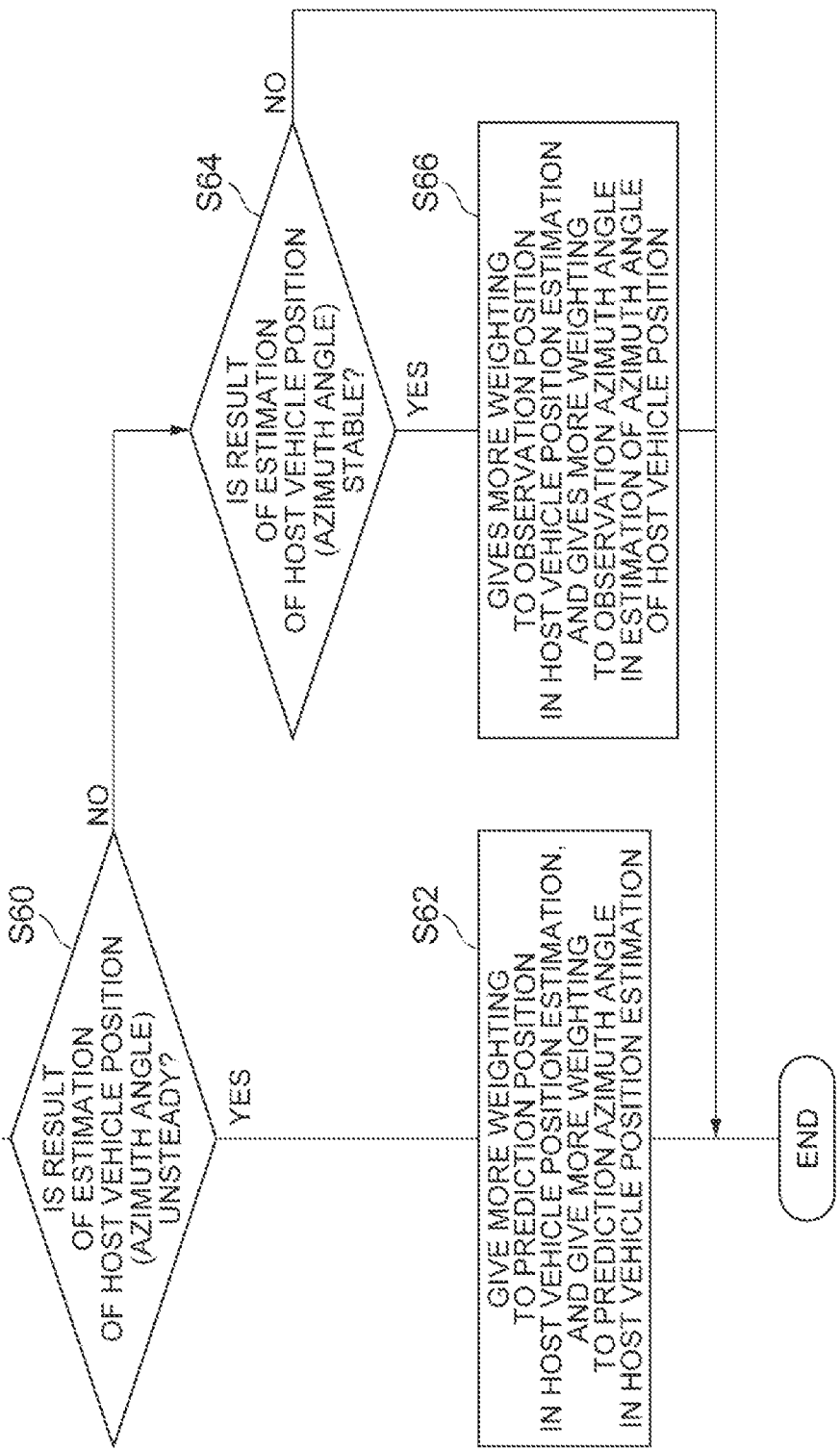
FIG. 7 is a flowchart illustrating an example of weighting change processing in the second embodiment.

FIG. 7 is a flowchart illustrating an example of weighting change processing in the second embodiment. The weighting change processing is performed, for example, when the host vehicle position estimation processing is performed a predetermined number of times. The weighting change processing may be performed according to the vehicle travel distance or may be performed periodically.

As illustrated in FIG. 7, as S60, the ECU 20 determines whether or not the result of estimation of the host vehicle position is unsteady using the unsteadiness determination unit 26. The unsteadiness determination unit 26 calculates, for example, the variation of the yaw rate (difference between the maximum value and the minimum value of the yaw rate) calculated from the azimuth angles of the host vehicle position Mz for a predetermined number of times in the past. If the variation of the yaw rate calculated from the azimuth angle of the host vehicle position Mz is equal to or greater than the unsteadiness azimuth angle threshold value, the unsteadiness determination unit 26 determines that the result of estimation of the host vehicle position is unsteady. If it is determined that the result of estimation of the host vehicle position is unsteady (Yes in S60), the ECU 20 makes the process proceed to S62. If it is determined that the result of estimation of the host vehicle position is not unsteady (No in S60), the ECU 20 makes the process proceed to S64.

In S62, the ECU 20 gives more weighting to the prediction position M1 in the host vehicle position estimation using the host vehicle position estimation unit 25, and gives more weighting to the prediction azimuth angle. The host vehicle position estimation unit 25 gives more weighting to the prediction azimuth angle in the host vehicle position estimation such that the azimuth angle of the host vehicle position Mz is estimated to be close to the prediction azimuth angle. The host vehicle position estimation unit 25 gives more weighting to the prediction azimuth angle by, for example, changing the azimuth angle gain of the azimuth angle Kalman filter. When the weighting increases to reach the upper limit, the host vehicle position estimation unit 25 does not perform further weighting. Thereafter, the ECU 20 ends the current processing.

In S64, the ECU 20 determines whether or not the result of estimation of the host vehicle position is stable using the unsteadiness determination unit 26. For example, if the variation of the yaw rate calculated from the azimuth angles of the host vehicle position Mz for a predetermined number of times in the past is smaller than the azimuth angle stability threshold value, the unsteadiness determination unit 26 determines that the result of estimation of the host vehicle position Mz is stable. If it is determined that the result of estimation of the host vehicle position is stable (Yes in S64), the ECU 20 makes the process proceed to S66. If it is determined that the result of estimation of the host vehicle position is not stable (No in S64), the ECU 20 ends the current processing.

In S66, the ECU 20 gives more weighting to the observation position M2 in the host vehicle position estimation using the host vehicle position estimation unit 25, and gives more weighting to the observation azimuth angle. The host vehicle position estimation unit 25 gives more weighting to the observation azimuth angle in the host vehicle position estimation such that the azimuth angle of the host vehicle position Mz is estimated to be close to the observation azimuth angle. The host vehicle position estimation unit 25 gives more weighting to the observation azimuth angle by, for example, changing the azimuth angle gain of the azimuth angle Kalman filter. When the weighting increases to reach the upper limit, the host vehicle position estimation unit 25 does not perform further weighting. Thereafter, the ECU 20 ends the current processing.

According to the host vehicle position estimation device 200 according to the second embodiment described above, when the result of estimation of the host vehicle position is unsteady caused by the influence of a shift of the observation position M2 and the observation azimuth angle due to the state of the target object such as the scrapes of the marking lines or the erroneous detection and the like, since more weighting is given to the prediction position M1 such that the host vehicle position Mz is estimated to be close to the prediction position M1 calculated from the result of measurement performed by the internal sensor 3, it is possible to suppress the unsteadiness in the result of estimation of the host vehicle position from continuing compared to a case of using the prediction position M1 and the observation position M2 in a fixed ratio for the host vehicle position estimation. In addition, according to host vehicle position estimation device 200, when the result of estimation of the host vehicle position is unsteady, since the more weighting is given to the prediction azimuth angle such that the azimuth angle is estimated to be close to the prediction azimuth angle, it is possible to suppress the unsteadiness of the azimuth angle of the host vehicle position Mz from continuing, compared to a case of using the azimuth angle of the host vehicle position Mz for the estimation with the fixed ratio of the observation azimuth angle to the prediction azimuth angle.

In addition, according to the host vehicle position estimation device 200, by estimating the host vehicle position Mz using the position Kalman filter, it is possible to obtain the same effect as in the first embodiment. Furthermore, according to the host vehicle position estimation device 200, since the azimuth angle of host vehicle position Mz is estimated using the azimuth angle Kalman filter, it is possible to improve the accuracy of estimating azimuth angle of the host vehicle position Mz compared to a case of estimating the azimuth angle of the host vehicle position with the ratio of the prediction azimuth angle to the observation azimuth angle without using the azimuth angle Kalman filter. In addition, in this case, it is possible to easily change the weighting for the prediction azimuth angle by changing the azimuth angle gain.

As described above, embodiments of the present disclosure are described, however, the present disclosure is not limited to the embodiments described above. The present disclosure can be embodied in various forms including various modifications and improvements based on the knowledge of those skilled in the art, including the embodiments described above.

The ECUs 10 and 20 of the host vehicle position estimation devices 100 and 200 may calculate the accuracy of the result of measurement performed by the external sensor 2. The accuracy of the result of measurement performed by the external sensor 2 is, for example, the accuracy of recognition of the image by the camera. The accuracy of recognition by the camera can be obtained by a known method of calculating the accuracy (reliability, or the like) of camera failure determination and image recognition. As the accuracy of the result of measurement by the radar sensor may be used as the accuracy of the result of measurement by the external sensor 2. The accuracy of the result of measurement by the radar sensor may be obtained by a known method for the failure determination of the radar sensor or the like. In addition, the accuracy of the result of measurement by the external sensor 2 may be obtained using a consistency between the target object recognized from the image captured by the camera and the target object recognized from the object information of the radar sensor. The accuracy of the result of measurement by the external sensor 2 becomes lower as the consistency becomes lower.

If the accuracy of the result of measurement by the external sensor 2 is lower than the determination threshold value, the ECUs 10 and 20 give less weighting to the observation position M2 and gives more weighting to the prediction position M1. The determination threshold value is a threshold having a value set in advance. When using the position Kalman filter, the ECUs 10 and 20 adjust the weighting by changing the gain. If the accuracy of the result of measurement by the external sensor 2 is lower than the determination threshold value, the host vehicle position estimation devices 100 and 200 may give less weighting to the observation azimuth angle and may give more weighting to the prediction azimuth angle. When using the azimuth angle Kalman filter, the ECUs 10 and 20 adjust the weighting by changing the azimuth angle gain.

The host vehicle position estimation device 100 according to in the first embodiment may estimate the azimuth angle of the host vehicle position Mz. In this case, any one of the observation azimuth angle or the prediction azimuth angle may be regarded as the azimuth angle of the host vehicle position Mz as it is, not necessarily need to obtain both the observation azimuth angle and the prediction azimuth angle as in the second embodiment. Alternatively, the direction from the past host vehicle position to the current host vehicle position Mz may be regarded as the azimuth angle of the host vehicle position Mz.

In the host vehicle position estimation device 200 according to the second embodiment, the unsteadiness determination unit 26 may determine whether or not the result of estimation of the host vehicle position is unsteady based on the variations of the host vehicle position (such as variations in the lateral position deviation) as in the first embodiment.

If it is determined that the result of estimation of the host vehicle position is unsteady, the host vehicle position estimation units 15 and 25 may increase the weighting of the prediction position M1 and/or the prediction azimuth angle only once. Similarly, if it is determined that the result of estimation of the host vehicle position is stable, the host vehicle position estimation units 15 and 25 may increase the weighting of the observation position M2 and/or the observation azimuth angle only once. The host vehicle position estimation units 15 and 25 may return the weighting of the prediction position M1 and the observation position M2 to the initial setting every time the vehicle travels regularly or a constant travel distance. The same applies to the weighting of the prediction azimuth angle and the observation azimuth angle.

The unsteadiness determination unit 16 may use a plurality of unsteadiness determination threshold values to determine the degree of unsteadiness in a stepwise manner. In this case, the unsteadiness determination unit 16 increases the weighting of the prediction position M1 as the degree of unsteadiness in the result of estimation of the host vehicle position increases (for example, as a difference between the minimum value and the maximum value of the lateral position deviation from the lane center of the vehicle in the results estimation of the host vehicle position for a predetermined number of times in the past increases). The degree of unsteadiness in the result of estimation of the host vehicle position can be determined by comparing the difference between the minimum value and the maximum value of the lateral position deviation from the lane center of the vehicle in the results estimation of the host vehicle position for a predetermined number of times in the past with a plurality of unsteadiness determination threshold values.

Similarly, the unsteadiness determination unit 16 may determine the degree of the stability of the result of estimation of the host vehicle position in a stepwise manner using a plurality of stability threshold values. In this case, the unsteadiness determination unit 16 increases the weighting of the observation position M2 as the degree of stability of the result of estimation of the host vehicle position increases (for example, as a difference between the minimum value and the maximum value of the lateral position deviation from the lane center of the vehicle in the results estimation of the host vehicle position for a predetermined number of times in the past decreases). These points can also be applied to the weighting of the prediction azimuth angle and the observation azimuth angle in the second embodiment.

The host vehicle position estimation unit 25 in the second embodiment may independently change the weighting of the prediction azimuth angle and the observation azimuth angle, and the weighting of the prediction position M1 and the observation position M2. If it is determined that the result of estimation of the host vehicle position is unsteady from the variation of the host vehicle position (such as lateral position deviation) for the predetermined number of times in the past as described in the first embodiment, the host vehicle position estimation unit 25 changes only the weighting of the prediction position M1 and the observation position M2.

In addition, if it is determined that the result of estimation of the host vehicle position is unsteady from the azimuth angle of the host vehicle position for the predetermined number of times in the past as described in the second embodiment, the host vehicle position estimation unit 25 may change only the weighting of the prediction azimuth angle and the observation azimuth angle.

In addition, the unsteadiness determination units 16 and 26 does not necessarily need to determine whether or not the result of estimation of the host vehicle position is stable. In this case, the processing for increasing the weighting of the observation position M2 or the observation azimuth angle according to the result of estimation of the host vehicle position is not essential.

What is claimed is:

1. A host vehicle position estimation device that is configured to estimate a host vehicle position that is a position of a vehicle on a map and an azimuth angle, the device comprising:
    a target object recognition unit configured to recognize a target object around the vehicle based on a result of detection performed by an external sensor of the vehicle;
    a target object database configured to store target object information including position information on the target object on the map;
    an observation position estimation unit configured to estimate an observation position of the vehicle on the map and an observation azimuth angle of the vehicle on the map based on a result of recognition of the target object performed by the target object recognition unit and the target object information;
    a prediction position calculation unit configured to calculate a prediction position of the vehicle on the map and a prediction azimuth angle of the vehicle on the map from a result of estimation of the host vehicle position in the past and a result of estimation of the azimuth angle of the host vehicle in the past based on a result of measurement performed by an internal sensor of the vehicle;
    a host vehicle position estimation unit configured to estimate the host vehicle position and the azimuth angle of the host vehicle position based on the observation position and the observation azimuth angle and the prediction position and the prediction azimuth angle; and
    an unsteadiness determination unit configured to:
        calculate a first difference between a minimum value and a maximum value of a lateral position deviation from a lane center of the vehicle based on the result of estimation of the host vehicle position,
        calculate a second difference between a maximum value and a minimum value of yaw rates calculated from azimuth angles of the host vehicle position for a predetermined number of times in the past, based on the result of estimation of the azimuth angle of the host vehicle position for the predetermined number of times in the past, and
        determine that the result of estimation of the host vehicle is unsteady when the first difference is equal to or greater than an unsteadiness determination threshold value or when the second difference is equal to or greater than an unsteadiness azimuth angle threshold value,
    wherein the host vehicle position estimation unit is configured to give more weighting to the prediction position in the estimation of the host vehicle position such that the host vehicle position is estimated to be close to the prediction position and to give more weighting to the prediction azimuth angle such that the azimuth angle of the host vehicle position is estimated to be close to the prediction azimuth angle, if it is determined by the unsteadiness determination unit that the result of estimation of the host vehicle position is unsteady.

2. The host vehicle position estimation device according to claim 1,
    wherein the host vehicle position estimation unit is configured to estimate the host vehicle position from the observation position and the prediction position using a position Kalman filter, and to change the weighting of the prediction position by changing a gain of the position Kalman filter.

3. The host vehicle position estimation device according to claim 2,
    wherein the host vehicle position estimation unit is configured to estimate the azimuth angle of the host vehicle position from the observation azimuth angle and the prediction azimuth angle using an azimuth angle Kalman filter, and to change the weighting of the prediction azimuth angle by changing an azimuth angle gain of the azimuth angle Kalman filter.

4. The host vehicle position estimation device according to claim 1,
    wherein the host vehicle position estimation unit is configured to estimate the azimuth angle of the host vehicle position from the observation azimuth angle and the prediction azimuth angle using an azimuth angle Kalman filter, and to change the weighting of the prediction azimuth angle by changing an azimuth angle gain of the azimuth angle Kalman filter.

5. The host vehicle position estimation device according to claim 1, wherein the first difference or the second difference is caused by a state of the target object due to scrapes of marking lines or an erroneous detection thereof.

6. The host vehicle position estimation device according to claim 1,
    wherein the host vehicle position estimation unit is configured to give more weighting to the observation position in the estimation of the host vehicle position such that the host vehicle position is estimated to be close to the observation position and to give more weighting to the observation azimuth angle such that the azimuth angle of the host vehicle position is estimated to be close to the observation azimuth angle, if it is not determined by the unsteadiness determination unit that the result of estimation of the host vehicle position is unsteady.

* * * * *